(12) United States Patent
White et al.

(10) Patent No.: US 6,498,560 B2
(45) Date of Patent: Dec. 24, 2002

(54) PROTECTOR ASSEMBLY AND METHOD FOR ELECTRICALLY INSULATING A THERMALLY RESPONSIVE PROTECTOR FROM A MOTOR WINDING OF AN ELECTRIC MOTOR

(75) Inventors: Kent Lee White, Maryland Heights, MO (US); Jeffery J. Meystrik, Webster Groves, MO (US); John H. Hussey, St. Louis, MO (US); Larry Dawson Barton, Russellville, KY (US); Vincent P. Fargo, St. Charles, MO (US)

(73) Assignee: Emerson Electric Co., St. Louis, MO (US)

( * ) Notice: Subject to any disclaimer, the term of this patent is extended or adjusted under 35 U.S.C. 154(b) by 61 days.

(21) Appl. No.: 09/815,739

(22) Filed: Mar. 23, 2001

(65) Prior Publication Data

US 2002/0135452 A1 Sep. 26, 2002

(51) Int. Cl.$^7$ .......................... H01H 71/02; H02H 7/08
(52) U.S. Cl. ...................... 337/104; 337/89; 337/380; 361/25; 361/105; 310/68 C
(58) Field of Search ................ 337/1, 12–14, 337/34, 85, 89, 101–104, 112, 380; 361/103, 105, 25; 310/68 C

(56) References Cited

U.S. PATENT DOCUMENTS

| | | |
|---|---|---|
| 3,131,322 A | 4/1964 | Pleiss, Jr., et al. |
| 3,200,274 A | 8/1965 | Munier |
| 4,376,926 A | 3/1983 | Senor |
| 4,454,493 A * | 6/1984 | Ubukata et al. ............ 337/368 |
| 4,866,408 A * | 9/1989 | Petraitis et al. ............ 337/104 |
| 5,103,202 A * | 4/1992 | Lennon et al. ............ 337/100 |
| 5,200,872 A * | 4/1993 | D'Entremont et al. .... 310/68 C |

* cited by examiner

Primary Examiner—Jayprakash N. Gandhi
(74) Attorney, Agent, or Firm—Thompson Coburn LLP

(57) ABSTRACT

A protector assembly and method for protecting motor windings from an overload condition. The assembly comprises a thermally responsive protector, a skirt, and a sleeve. The protector comprises a housing, an end cap, at least one terminal, and a thermally responsive member. The end cap covers an open end of the housing. The terminal extends through the end cap. The thermally responsive member is within the housing and adapted to be electrically coupled to the motor winding via the terminal. The protector is adapted to be positioned in heat-transfer relation wit the motor winding in a manner such that the thermally responsive member is responsive to an overload condition of the motor winding. The skirt and sleeve are of dielectric materials. The skirt is positioned on the protector in a manner such that the skirt surrounds the end cap and the terminal. The skirt is between the end cap and the sleeve. The skirt and sleeve are adapted to provide a dielectric barrier between the protector and the motor winding when the protector is positioned in heat-transfer relation with the motor winding.

27 Claims, 2 Drawing Sheets

PROTECTOR ASSEMBLY AND METHOD FOR ELECTRICALLY INSULATING A THERMALLY RESPONSIVE PROTECTOR FROM A MOTOR WINDING OF AN ELECTRIC MOTOR

BACKGROUND OF THE INVENTION

This invention relates to protector assemblies and methods for protecting motor windings from shorting the protector.

Winding protectors are designed to protect electric motors from an overload condition. A typical winding protector is electrically coupled to a motor's winding and adapted to break current through the winding when the protector senses excessive temperature or current in the winding. The protector includes a housing having an open end, a cap enclosing the open end, one or two pin-type terminals extending through the cap, and a thermally-responsive member within the housing and electrically coupled to the terminals. The protector is adapted to be positioned in heat-transfer relation to the motor's winding such that heat generated by the winding is transferred to the thermally-responsive member via the housing. The thermally-responsive member is configured to move to an open-circuit position when the thermally-responsive member is heated to a particular temperature. To facilitate heat transfer from the winding to the thermally-responsive member, the housing is metal, typically steel. Because the housing and pin-type terminals are metal and therefor electrically conductive, a dielectric sleeve is positioned over the protector to prevent the protector from short circuiting the winding.

A problem associated with such a protector is that the connection of the cap to the housing produces a relatively sharp edge capable of cutting through the dielectric sleeve. The pin-type terminals are also capable of cutting through the dielectric sleeve. A risk of short circuiting the winding occurs if any part of the protector cuts through the sleeve.

One known solution for reducing the risk of the protector short circuiting the winding is replacing the sleeve with a plastic protector cover, molded to fully cover the protector. The protector cover is often an undesirable solution because it is substantially thicker than the sleeve and therefor provides more thermal insulation between the protector and winding than does the sleeve. Accordingly, a higher winding temperature is needed before the thermally-responsive member is heated sufficiently to move to its open-current position, necessitating the selection of a different protector with different operating characteristics. Also, the shape and rigidity of the protector cover make placement of the cover in the end-wire envelope difficult. Moreover, the cost of the molded cover is substantially greater than that of the sleeve.

SUMMARY OF THE INVENTION

Among the several advantages of the present invention is the provision of an improved dielectric barrier for and method of electrically insulating a thermally responsive protector from a motor winding of an electric motor; the provision of such a barrier and method which prevents the protector from short circuiting the motor winding; the provision of such a barrier and method which does not provide excessive thermal insulation between the protector and motor winding; the provision of such a barrier and method which overcome the disadvantages associated with the prior art.

In general, a method of the present invention is for insulating a thermally responsive protector from a motor winding of an electric motor. The protector comprises a thermally and electrically conductive housing, a thermally responsive member, an end cap, and at least one terminal. The housing has an open rearward end, a closed forward end, and an intermediate portion between the ends. The thermally responsive member is within the housing. The end cap covers the open end of the housing. The terminal extends through the end cap. The terminal is electrically insulated from the housing and has an outer end extending rearwardly out of the end cap. The thermally responsive member is adapted to be electrically coupled to the motor winding via the terminal. The protector is adapted to be positioned in heat-transfer relation with the motor winding in a manner such that the thermally responsive member is responsive to an overload condition of the motor winding. The method comprises providing a skirt having a forward portion and a rearward portion, and positioning the skirt on the protector in a manner such that: (a) the skirt is spaced from the intermediate portion of the housing; (b) the forward portion of the skirt surrounds the end cap; and (c) the rearward portion of the skirt extends rearwardly from the end cap and surrounds the outer end of the terminal. The skirt is of a dielectric material. The method further comprises providing a sleeve of a dielectric material and positioning the sleeve relative to the protector such that the sleeve surrounds the skirt and surrounds the protector in a manner in which the sleeve is in engagement with the intermediate portion of the housing. The positioning of the skirt and of the sleeve is maintained such that the sleeve and skirt provide a dielectric barrier between the protector and the motor winding when the protector is positioned in heat-transfer relation with the motor winding.

Another aspect of the present invention is a protector assembly for protecting an electric motor from an overload condition. The motor has a motor winding. The assembly comprises a thermally responsive protector, a skirt, and a sleeve. The protector comprises a housing which is both thermally and electrically conductive, an end cap, at least one terminal, and a thermally responsive member. The housing has an open rearward end, a closed forward end and an intermediate portion between the ends. The end cap covers the open end of the housing. The terminal extends through the end cap and is electrically insulated from the housing. The terminal has an outer end extending rearwardly out of the end cap. The thermally responsive member is within the housing and adapted to be electrically coupled to the motor winding via the terminal. The protector is adapted to be positioned in heat-transfer relation with the motor winding in a manner such that the thermally responsive member is responsive to an overload condition of the motor winding. The skirt is of a dielectric material and has a forward portion and a rearward portion. The sleeve is of a dielectric material. The skirt is positioned on the protector in a manner such that: (a) the skirt is spaced from the intermediate portion of the housing; (b) the forward portion of the skirt surrounds the end cap; and (c) the rearward portion of the skirt extends rearwardly from the end cap and surrounds the outer end of the terminal. The sleeve surrounds the skirt and surrounds the protector in a manner in which the sleeve is in engagement with the intermediate portion of the housing. The skirt is between the end cap and the sleeve. The skirt and sleeve are adapted to provide a dielectric barrier between the protector and the motor winding when the protector is positioned in heat-transfer relation with the motor winding.

Other objects and features will be in part apparent and in part pointed out hereinafter.

BRIEF DESCRIPTION OF DRAWINGS

Corresponding reference characters indicate corresponding parts throughout the several views of the drawings.

DETAILED DESCRIPTION

Figure 1:
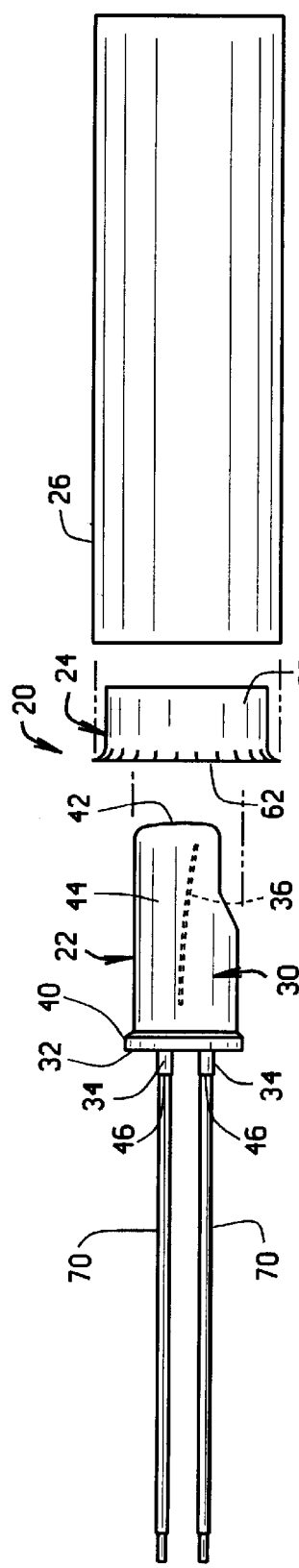
FIG. 1 is an exploded, side-elevational view of a protector assembly of the present invention, the protector assembly comprising a thermally responsive protector, a skirt, and a sleeve.

Referring now to the drawings, and first more particularly to FIG. 1, a protector assembly of the present invention is indicated in its entirety by the reference numeral 20. The protector assembly 20 comprises a thermally responsive protector, generally indicated at 22, a skirt, generally indicated at 24, and a sleeve 26.

Figure 8:
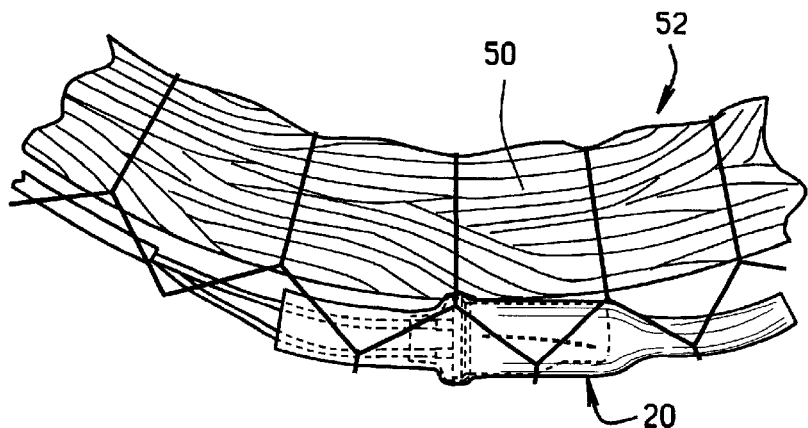
FIG. 8 is a fragmented, top plan view of the protector assembly of FIG. 4 in heat-transfer relation to a motor winding of an electric motor.

The thermally responsive protector 22 is preferably of the type disclosed in detail in U.S. Pat. No. 4,376,926, incorporated herein by reference. Also, the protector is preferably of the type commercially available from Texas Instruments Incorporated, Dallas, Tex., such as a 15HM Series Protector. The protector 22 preferably includes a housing, generally indicated at 30, an end cap 32, two terminals 34, and a thermally responsive member 36 (shown in hidden lines). The housing 30 and end cap 32 are preferably of low carbon steel or any other suitable material which is both thermally and electrically conductive. The housing 30 is preferably tubular in shape and has an open rearward end 40, a closed forward end 42, and an intermediate portion 44 between the ends. As shown in FIG. 1, the open rearward end 40 of the housing is preferably flared to form a lip or flange. The end cap 32 covers the rearward end 40 of the housing 30. Preferably, the terminals 34 are pin-type terminals extending through the end cap 32. The terminals 34 are secured to the end cap 32 via conventional glass-sealing means or the like which further serves to electrically insulate the terminals from the end cap and housing. Each terminal 34 has an outer end 46 extending rearwardly out of the end cap 32. The thermally responsive member 36 is within the housing 30 and adapted to be electrically coupled to windings 50 of an electric motor 52 (see FIG. 8) via the terminals 34. The protector is adapted to be positioned in heat-transfer relation with the motor windings 50 in a manner such that the thermally responsive member 36 is responsive to an overload condition of the motor winding.

Figure 5:
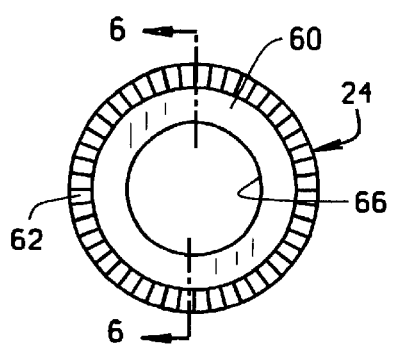
FIG. 5 is a rear end view of the skirt of FIG. 1.
Figure 6:
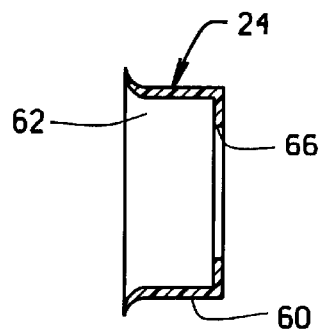
FIG. 6 is a cross-sectional view of the skirt taken along the plane of line 6—6 of FIG. 5.
Figure 7:
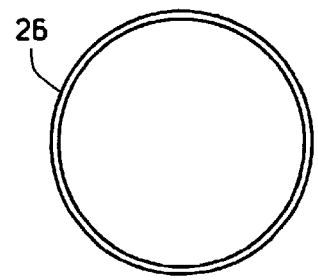
FIG. 7 is an end view of the sleeve of FIG. 1.

Referring to FIGS. 1, 5 and 6, the skirt 24 has a forward portion 60 and a rearward portion 62. The skirt 24 is of a suitable dielectric material. Preferably the skirt 24 is made from a polyester film material drawn over a mandrel. The skirt material may be heat deformable, but is preferably of a low-shrink or no-shrink material, such as that commercially available from DuPont under the designation Mylar® M021. Although the skirt is preferably of Mylar®, it is to be understood that other materials may be employed without departing from the scope of this invention. The skirt 24 has an opening 66 (FIGS. 5 and 6) through its forward end sized for allowing the intermediate portion 44 of the housing to be extend therethrough. In particular, the diameter of the skirt's opening 66 is preferably slightly smaller than the diameter of the intermediate portion 44 of the housing 30 to provide an interference fit.

Figure 2:
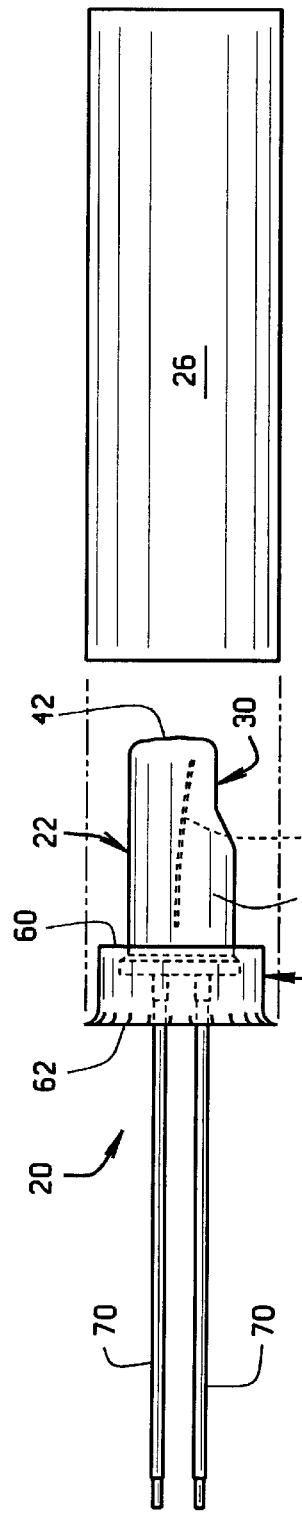
FIG. 2 is an exploded, side-elevational view of the protector assembly of FIG. 1, the view being similar to FIG. 1 but showing the skirt positioned over an end cap and terminals of the thermally responsive protector.

As shown in FIG. 2, the skirt 24 is adapted to be positioned on the protector 22 in a manner such that the skirt is spaced from the intermediate portion 44 of the housing 30, the forward portion 60 surrounds the end cap 32, and the rearward portion 62 of the skirt extends rearwardly from the end cap and extends rearwardly beyond the outer ends 46 of the terminals 34.

Figure 3:
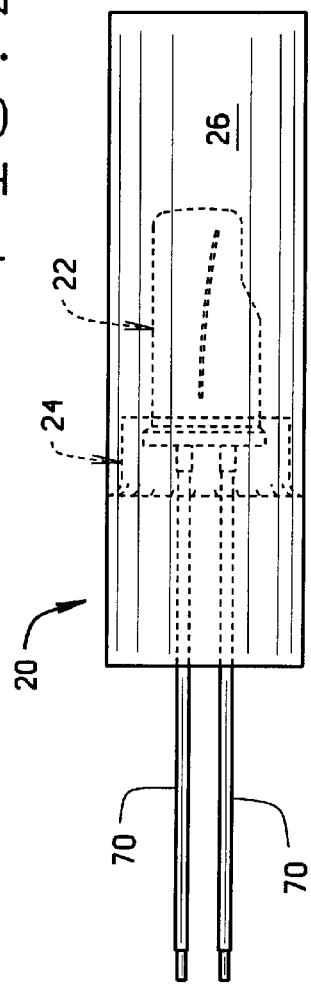
FIG. 3 is a side-elevational view of the protector assembly of FIG. 1, the view being similar to FIG. 2 but showing the sleeve covering the protector and end cap.
Figure 4:
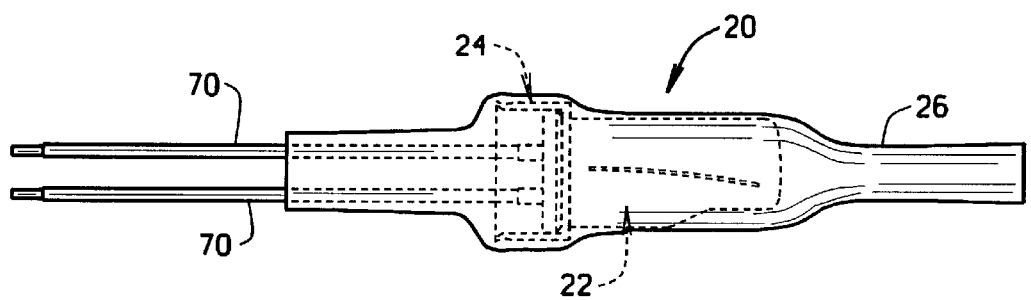
FIG. 4 is a side-elevational view of the protector assembly of FIG. 1, the view being similar to FIG. 3 but showing the sleeve and skirt in a heat-deformed condition around the protector.

The sleeve 26 is preferably of a dielectric, polyester tubing, and more preferably of a spiral-wound tubing such as that commercially available from DuPont under the designation Mylar® EL (non-shrink) or AHS (low-shrink). Although the sleeve is preferably of a non-shrink or low-shrink material, it is to be understood that a high-shrink material may be used without departing from the scope of this invention. As shown in FIGS. 3 and 4, the sleeve 26 is adapted to surround the skirt 24 and surround the protector 22 in a manner in which the sleeve is in engagement with the intermediate portion 44 of the housing 30 and with the skirt 24 being positioned between the end cap 32 and the sleeve.

To insulate the protector 22 from the motor windings 50 of the electric motor 52, the skirt 24 is positioned on the protector in the manner discussed above, and then the sleeve 26 is positioned over the protector and over the skirt in the manner discussed above. Preferably, the diameter of the rearward end of the skirt 24 is greater than the inside diameter of the sleeve 26 to provide an interference fit between the sleeve and skirt. If the sleeve 26 is of a heat-deformable material, heat is applied to the sleeve 26 in a manner which deforms the sleeve. Preferably, the skirt 24 maintains its shape even when the sleeve 26 is deformed. Because of the characteristics of the skirt 24, it keeps the sleeve 26 spaced from the outer ends 46 of the terminal during heat-deformation of the sleeve. Even after heat-deformation of the sleeve 26, the skirt 24 remains spaced from the outer ends 46 of the terminal and keeps the sleeve from engaging the terminals. Preferably, the sleeve 26 is sufficiently deformed around the intermediate portion 44 of the housing 30 such that inner surface of the sleeve engages the intermediate portion of the housing. This may be accomplished by heat-shrinking the sleeve 26 on the protector 22 or by selecting a sleeve of a non-shrink pliable material. Deforming the sleeve 26 such that its inner surface engages the intermediate portion 44 of the housing enables the intermediate portion to be positioned as close as possible to the windings 50. After the sleeve 26 is deformed, the terminals 34 are electrically coupled to the motor windings 50 via conductors 70, and the protector 22 is positioned adjacent the windings 50 such that the intermediate portion 44 of the housing is in heat-transfer relation with the windings in a manner such that the thermally responsive member 36 is responsive to an overload condition of the windings.

It is to be understood from the above description that the skirt 24 and sleeve 26 are adapted to provide a dielectric barrier between the protector and the motor winding 50 (FIG. 8) when the protector 22 is positioned in heat-transfer relation with the motor winding. The skirt 24 provides an extra barrier in the vicinity of the terminals 34, end cap 32 and rearward end 40 of the housing 22—i.e., the region of the protector 22 most capable of cutting through the wall of the sleeve 26—to prevent the protector from shorting the windings 50. Because the skirt 24 is spaced from at least most of the intermediate portion 44 of the housing, the skirt 24 does not thermally insulate the thermally-responsive member 36 from the windings 50. Thus, the skirt 24 reduces the likelihood of a short-circuit condition without over-insulating the protector 22.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A protector assembly for protecting an electric motor from an overload condition, the motor having a motor winding, the assembly comprising:

a thermally responsive protector comprising a thermally and electrically conductive housing and at least one terminal, the housing having rearward and forward ends and an intermediate portion between the ends, the terminal being electrically insulated from the housing and having an outer end extending rearwardly from the rearward end of the housing, the protector being adapted to be positioned in heat-transfer relation with the motor winding in a manner such that the protector is responsive to an overload condition of the motor winding;

a skirt having a forward portion and a rearward portion, the skirt being of a dielectric material;

the skirt being positioned on the protector in a manner such that: (a) the skirt is spaced from the intermediate portion of the housing; (b) the forward portion of the skirt surrounds the rearward end of the housing; and (c) the rearward portion of the skirt extends rearwardly from the rearward end of the housing and surrounds the outer end of the terminal;

the skirt being adapted to provide a dielectric barrier between the protector and the motor winding when the protector is positioned in heat-transfer relation with the motor winding.

2. A protector assembly as set forth in claim 1 further comprising a dielectric member surrounding the protector, the skirt and dielectric member being adapted to provide a dielectric barrier between the protector and the motor winding when the protector is positioned in heat-transfer relation with the motor winding.

3. A protector assembly as set forth in claim 2 wherein the dielectric member comprises a sleeve of a dielectric material, the sleeve surrounding the skirt and surrounding the protector in a manner in which the sleeve is in engagement with the intermediate portion of the housing.

4. A protector assembly as set forth in claim 3 wherein the sleeve is a heat-deformable tubular-shaped sleeve, the sleeve being deformed in a manner such that the sleeve is fixed to the protector.

5. A protector assembly as set forth in claim 4 wherein the sleeve is in direct engagement with the intermediate portion of the housing.

6. A protector assembly as set forth in claim 4 wherein the sleeve is spaced from the terminal.

7. A protector assembly as set forth in claim 6 wherein the skirt is spaced from the terminal.

8. A protector assembly as set forth in claim 4 wherein the skirt keeps the sleeve spaced from the terminal.

9. A protector assembly as set forth in claim 4 wherein the skirt is of a non heat-shrinkable material.

10. A protector assembly as set forth in claim 1 wherein the at least one terminal comprises a first terminal, and wherein the protector assembly further comprises a second terminal spaced from the first terminal.

11. A motor assembly comprising a motor winding and a protector assembly as set forth in claim 1, the protector assembly being positioned in heat-transfer relation with the motor winding in a manner such that the thermally responsive member is responsive to an overload condition of the motor winding.

12. A protector assembly for protecting an electric motor from an overload condition, the motor having a motor winding, the assembly comprising:

a thermally responsive protector comprising a thermally and electrically conductive housing and at least one terminal, the housing having rearward and forward ends and an intermediate portion between the ends, the terminal having an outer end extending rearwardly from the rearward end of the housing;

a skirt having a forward portion and a rearward portion, the skirt being of a dielectric material; and the skirt being positioned on the protector in a manner such that: (a) the skirt is spaced from the intermediate portion of the housing; (b) the forward portion of the skirt surrounds the rearward end of the housing; and (c) the rearward portion of the skirt extends rearwardly from the rearwar end of the housing and surrounds the outer end of the terminal.

13. A method of insulating a thermally responsive protector from a motor winding of an electric motor, the protector comprising a thermally and electrically conductive housing having rearward and forward ends and an intermediate portion between the ends, and at least one terminal, the terminal being electrically insulated from the housing and having an outer end extending rearwardly from the rearward end, the protector being adapted to be positioned in heat-transfer relation with the motor winding in a manner such that the protector is responsive to an overload condition of the motor winding, the method comprising:

providing a skirt having a forward portion and a rearward portion, the skirt being of a dielectric material; and positioning the skirt on the protector in a manner such that: (a) the skirt is spaced from the intermediate portion of the housing; (b) the forward portion of the skirt surrounds the rearward end of the housing; and (c) the rearward portion of the skirt extends rearwardly from the rearward end of the housing and surrounds the outer end of the terminal.

14. A method as set forth in claim 1 further comprising:

providing a sleeve of a dielectric material;

positioning the sleeve relative to the protector such that the sleeve surrounds the skirt and surrounds the protector in a manner in which the sleeve is in engagement with the intermediate portion of the housing.

15. A method as set forth in claim 14 further comprising maintaining the positioning of the skirt and of the sleeve such that the sleeve and skirt provide a dielectric barrier between the protector and the motor winding when the protector is positioned in heat-transfer relation with the motor winding.

16. A method as set forth in claim 15 wherein the step of providing the sleeve comprises providing a sleeve of a heat-deformable material and wherein the step of maintaining the positioning of the skirt and of the sleeve comprises heating the sleeve in a manner to deform the sleeve.

17. A method as set forth in claim 15 wherein the step of providing the sleeve comprises providing a sleeve of a heat-deformable material and wherein the step of maintaining the positioning of the skirt and of the sleeve comprises:

heating the sleeve in a manner to deform the sleeve; and allowing the sleeve to cool in its deformed condition.

18. A method as set forth in claim 15 wherein the sleeve is of a heat-shrinkable material and wherein the step of maintaining the positioning of the skirt and the sleeve comprises heat-shrinking the sleeve on the protector in a manner to maintain the skirt spaced from the intermediate portion of the housing with the forward portion of the skirt surrounding the rearward end of the housing and with the rearward portion of the skirt extending rearwardly from the rearward end of the housing and surrounding the outer end of the terminal.

19. A method as set forth in claim 18 wherein the step of heat-shrinking the sleeve further comprises heat-shrinking the sleeve in a manner such that the sleeve is in direct engagement with the intermediate portion of the housing.

20. A method as set forth in claim 19 wherein the step of providing the skirt comprises providing a skirt of a non heat-shrinkable material.

21. A method as set forth in claim 14 wherein the step of providing the skirt comprises providing a skirt configured and adapted to keep the sleeve spaced from the outer end of the terminal during the deforming of the sleeve.

22. A method as set forth in claim 14 wherein the step of providing the sleeve comprises providing a tubular-shaped sleeve.

23. A method as set forth in claim 1 wherein the step of providing the skirt comprises providing a skirt of a non heat-shrinkable material.

24. A method as set forth in claim 1 wherein the step of providing the skirt comprises forming the skirt from a polymeric film.

25. A method as set forth in claim 1 further comprising:

electrically coupling the terminal to the: motor winding; and positioning the housing in heat-transfer relation with the motor winding in a manner such that the protector is responsive to an overload condition of the motor winding.

26. A method as set forth in claim 1 wherein: the protector has a radially extending flange at the rearward end of the housing; the skirt has a central opening through the skirt's forward portion; and the step of positioning the skirt on the protector comprises inserting the forward end of the protector's housing through the central opening of the skirt and sliding the skirt rearwardly to a position in which the rearward portion of the skirt extends rearwardly beyond the flange.

27. A method as set forth in claim 1 wherein the skirt surround the entire outer end of the terminal.

* * * * *